United States Patent
Bols et al.

(10) Patent No.: US 11,040,758 B2
(45) Date of Patent: Jun. 22, 2021

(54) DEVICE AND METHOD FOR PAYING OUT AN ELONGATED FLEXIBLE ARTICLE FROM A VESSEL

(71) Applicant: Tideway B.V., Breda (NL)

(72) Inventors: Lucas Jan Adriaan Maria Bols, Ravels (BE); Philip Meijnardt Jacobus Scheers, Meer (BE); Marco Martinus Maria Gremmen, Berghem (NL)

(73) Assignee: DEME Offshore NL B.V., Breda (NL)

( * ) Notice: Subject to any disclaimer, the term of this patent is extended or adjusted under 35 U.S.C. 154(b) by 0 days.

(21) Appl. No.: 16/472,316

(22) PCT Filed: Dec. 21, 2017

(86) PCT No.: PCT/NL2017/050863
§ 371 (c)(1),
(2) Date: Jun. 21, 2019

(87) PCT Pub. No.: WO2018/117833
PCT Pub. Date: Jun. 28, 2018

(65) Prior Publication Data
US 2019/0382085 A1    Dec. 19, 2019

(30) Foreign Application Priority Data

Dec. 23, 2016  (NL) ..................................... 2018078

(51) Int. Cl.
*B63B 35/04*  (2006.01)
*B63B 35/03*  (2006.01)
(Continued)

(52) U.S. Cl.
CPC .............. *B63B 35/04* (2013.01); *B63B 35/03* (2013.01); *H02G 1/10* (2013.01); *F16L 1/203* (2013.01); *F16L 1/235* (2013.01)

(58) Field of Classification Search
CPC ....... F16L 1/12; F16L 1/14; F16L 1/15; F16L 1/16; F16L 1/203; F16L 1/205;
(Continued)

(56) References Cited

U.S. PATENT DOCUMENTS 3,680,342 A * 8/1972 Mott ......................... F16L 1/18
72/161
3,712,100 A * 1/1973 Key .......................... F16L 1/18
72/161

(Continued)

FOREIGN PATENT DOCUMENTS

JP          2009236288 A     10/2009
NL             1041049 A      7/2016

*Primary Examiner* — Frederick L Lagman
(74) *Attorney, Agent, or Firm* — The Webb Law Firm

(57) ABSTRACT

A device for paying out an elongated flexible article from a vessel is described. The device comprises a storage unit for the article, overboarding guide means for the article, article support means defining a cable path between the storage unit and the overboarding guide means, and pulling means for advancing the elongated article along the path. The article support means comprise an overboarding support element that is translatable in a first direction, and a buffering support system comprising a support element that is translatable in a second direction, whereby a translation of the support element has the effect of varying the length of the cable path. A vessel equipped with the device is also described. The device and method allow paying out an elongated flexible article from a vessel in a more efficient way.

16 Claims, 6 Drawing Sheets

(51) Int. Cl.
  *F16L 1/235* (2006.01)
  *H02G 1/10* (2006.01)
  *F16L 1/20* (2006.01)

(58) Field of Classification Search
  CPC ... F16L 1/207; F16L 1/23; F16L 1/235; E02B 2017/0095; B63B 35/03; B63B 35/04
  USPC .................. 405/166, 168.1, 168.3, 168.4
  See application file for complete search history.

(56) References Cited

U.S. PATENT DOCUMENTS

| | | | | |
|---|---|---|---|---|
| 3,965,713 | A * | 6/1976 | Horton | F16L 1/18 72/146 |
| 4,100,753 | A * | 7/1978 | Mott | E02B 17/027 166/351 |
| 5,145,289 | A * | 9/1992 | Titus | E21B 43/0107 166/350 |
| 5,971,666 | A * | 10/1999 | Martin | F16L 1/161 405/168.1 |
| 8,747,025 | B2 * | 6/2014 | Anderson | H02G 1/10 405/166 |
| 9,249,900 | B2 * | 2/2016 | Ardavanis | F16L 1/205 |
| 2005/0019100 | A1 * | 1/2005 | Simpson | F16L 1/19 405/166 |
| 2007/0258772 | A1 * | 11/2007 | Bursaux | B63B 35/03 405/166 |
| 2010/0034591 | A1 * | 2/2010 | Wilson | F16L 1/024 405/168.3 |
| 2010/0196100 | A1 * | 8/2010 | Soe-Jensen | H02G 9/06 405/169 |
| 2014/0037384 | A1 * | 2/2014 | Moeller | E02B 17/0004 405/158 |
| 2014/0133919 | A1 | 5/2014 | Anderson et al. | |
| 2014/0345245 | A1 * | 11/2014 | Borch-Jensen | H02G 1/10 59/78.1 |
| 2015/0010360 | A1 | 1/2015 | Lebelle et al. | |
| 2015/0354728 | A1 * | 12/2015 | Ramslie | F16L 1/161 405/166 |
| 2017/0346264 | A1 * | 11/2017 | Wilson | H02G 1/081 |

* cited by examiner

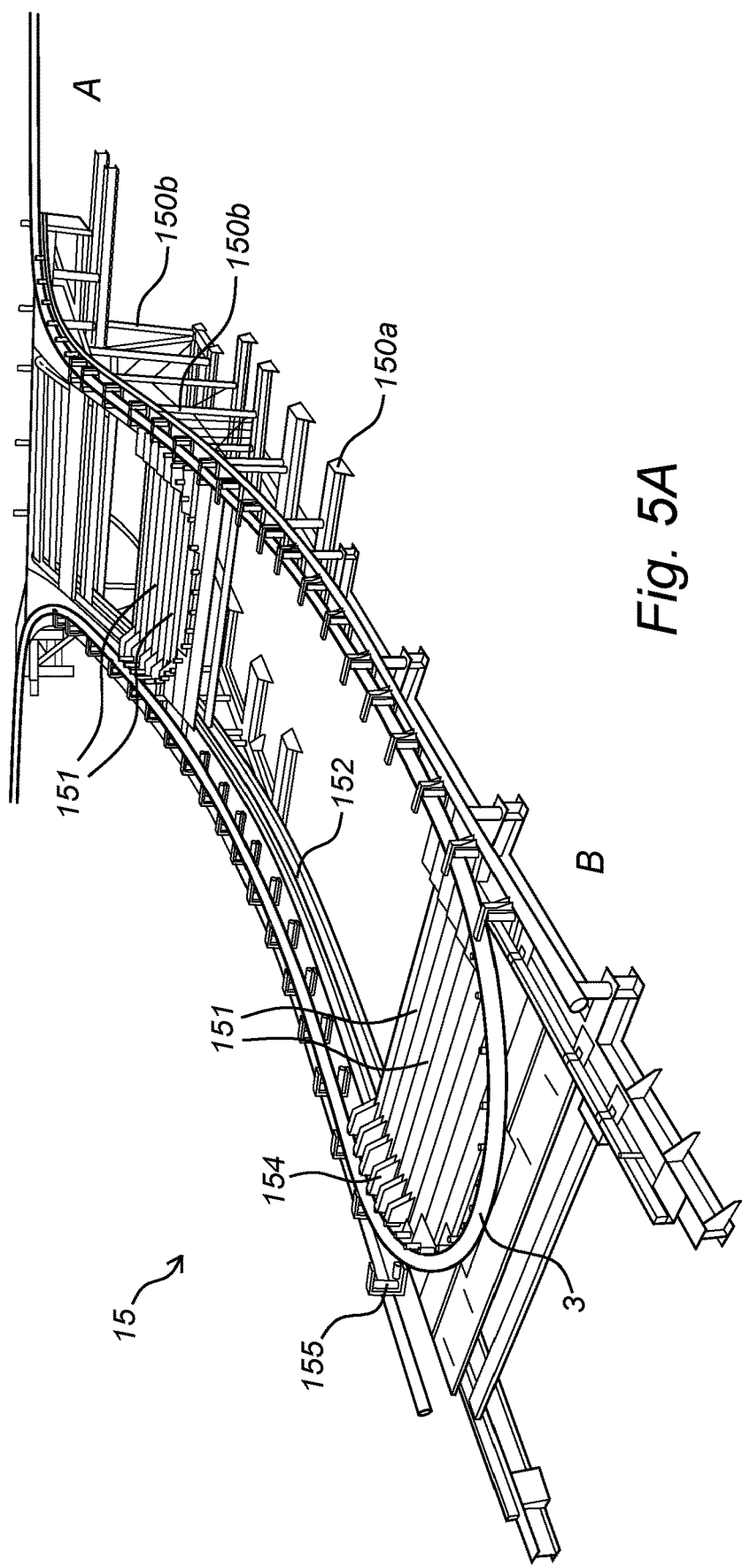

DEVICE AND METHOD FOR PAYING OUT AN ELONGATED FLEXIBLE ARTICLE FROM A VESSEL

CROSS-REFERENCE TO RELATED APPLICATIONS

This application is the United States national phase of International Application No. PCT/NL2017/050863 filed Dec. 21, 2017, and claims priority to Dutch Patent Application No. 2018078 filed Dec. 23, 2016, the disclosures of which are hereby incorporated by reference in their entirety.

BACKGROUND OF THE INVENTION

Field of the Invention

The present invention relates to a device for paying out an elongated flexible article from a vessel. The invention further relates to a vessel comprising the device, to a method for paying out an elongated flexible article from a vessel, and to a method for laying an elongated flexible article on or in a sea bed using the vessel.

Description of Related Art

There is an increasing demand for laying elongated flexible articles on or in a seabed or the bed of another body of water. In the context of this application, an elongated flexible article is meant to comprise articles such as power, electrical, and data communication cables, but also articles like umbilicals or flexible pipelines for instance. Typically, cable-laying is needed when connecting an off-shore wind turbine generator to the electricity network or to an offshore transformer station or any other type of offshore structure. When discussing cable-laying below, it should be clear that the invention is not limited to laying cables, and the invention may be used for laying any other flexible elongated article on or in a seabed.

Laying elongated flexible articles such as cables on or in a seabed is commonly carried out from so-called cable-laying vessels adapted for this purpose. Typically, these vessels are fitted with one or more storage units for the elongated flexible article, overboarding guide means adapted to smoothly lead the article overboard into the water, article support means defining an article path between the storage unit(s) and the overboarding guide means, and pulling means for advancing the elongated article along the path. The pulling means may comprise a cable-tensioning device to control the tension of the article as it exits the vessel through the overboarding guide means.

In a known method of providing an off-shore wind turbine generator with a cable, a cable-laying vessel is sailed to the off-shore location of the wind turbine generator or its foundation. A wind-turbine typically comprises a hub on top to which cabling should be connected. To connect the cable to the hub of the wind turbine generator requires providing a vertical length of cable in order to bridge the distance from the seabed to a junction box provided on the foundation of the wind turbine generator, some distance above the water-line. To provide such length, the cable-laying vessel typically sails away from the wind turbine generator over a certain distance while paying out cable to access and cut the cable at a point where the length is sufficient to bridge the required distance. The vessel subsequently sails back to the wind turbine generator and the payed-out length of cable is routed and pulled up along the wind turbine generator or other type of offshore structure in order to reach the connection point.

The above sequence of events is time-consuming and inefficient, in particular when a plurality of wind turbine generators need to be connected and/or when space around the wind turbine generator(s) is limited. There may also be issues of product, personnel and equipment safety.

It is an object of the present invention therefore to provide a device and method for paying out a flexible elongated structure from a vessel with an increased efficiency, in particular for connecting a cable to an off-shore wind turbine generator, or any other type of offshore structure.

SUMMARY OF THE INVENTION

Accordingly, the invention provides a device for paying out an elongated flexible article from a vessel, the device comprising a storage unit for the article, overboarding guide means for the article, article support means defining a path for the article between the storage unit and the overboarding guide means, and pulling means for advancing the elongated article along the path, wherein the article support means comprise an overboarding support element adapted to bring a length of cable overboard in a first direction, and a buffering support system comprising a buffering support element, adapted to be translatable in a second direction, whereby a translation of the buffering support element has the effect of varying the length of the article path.

The device according to the invention allows storing a variable length of an elongated flexible article such as a cable on a vessel; in particular on a work deck of the vessel, and in particular an increased length of article. The stored increased length of the article may in an embodiment be used to supply the distance from the sea bed to a connection point provided above the seabed of an off-shore wind turbine generator while the vessel is held substantially stationary in the immediate vicinity of the wind turbine generator. Time-consuming maneuvering of the vessel is no longer needed and, since the vessel is close to the wind turbine generator during cable-laying, operations to connect the cable to the wind turbine generator or other similar operations may be carried out simultaneously.

The second direction may be the same or, in an embodiment, may be different from the first direction. An embodiment of the invention provides a device wherein the second direction is perpendicular to the first direction. When provided on a work deck of a cable laying vessel, the first direction is preferably parallel to the longitudinal direction of the vessel. In the present embodiment, the second direction would then extend in an athwartships direction.

An embodiment that allows varying the length of the cable in a practical way is provided by a device wherein the buffering support element is translatable between a short position that corresponds to a short path length of the article to a long position that corresponds to a long path length of the article. On a cable-laying vessel, a short position of the second cable support element would for instance comprise a position that is relatively close to a straight cable path on the vessel, while a long position would comprise a position that is relatively distant from a straight cable path on the vessel.

The buffering support system is used to provide a path for the article that is longer than a usual path provided on the vessel. A usual path substantially extends in a first direction defined as the direction in which the article is brought overboard through the overboarding guide means. In an embodiment of the invention, the buffering support system comprises a plurality of support elements that are translatable in the second direction on a rail guide provided along the path of the article. The plurality of support elements may for instance comprise a plurality of carriers, provided one against the other and translatable in the second direction along the rail guide.

The overboarding support elements and/or the buffering support element(s) may be translatable by autonomous means, such as a motor. Preferably, according to an embodiment of the device, the overboarding and/or buffering support element(s) are translatable by pulling on a flexible pulling means such as a rope provided along the cable path.

In order to prevent damage to the cable by a too short radius of curvature, an embodiment of the device is characterized in that the overboarding support element and/or the buffering support system comprise a curved surface and/or curved track defining the article's path. A curved track may suitably be formed by a plurality of rollers that guide the flexible elongated article along the curved track.

A preferred embodiment relates to a device wherein the curved surface and/or curved track is semi-circular. This provides a semi-circular support path for the article. The radius of the semi-circular support path provided by the curved surface and/or track s preferably chosen to be equal to or larger then the minimum radius of curvature of the cable. Bending the cable along a radius that is equal or larger than the minimum radius of the cable prevents damage to the cable.

In a useful embodiment, the curved track comprises a plurality of rollers and/or fingers between which the article is guided. The fingers and/or rollers preferably extend in an upward direction with respect to the plane of the buffering support elements, and the fingers and/or rollers may be provided on the buffering support elements (such as the carriers) or may be connected to the rails in an embodiment. The rollers may guide the article in the second direction whereas the fingers may be instrumental in translating the article together with buffering support elements in the second direction.

In operation, a flexible article is typically led along the support means and over the overboarding and/or the buffering support elements of the buffering support system. In other operation modes, the article may be payed-out straight over the overboarding means in the first direction and does not require the overboarding support element nor the buffering system. The support elements are typically planar and arranged such that their plane is about parallel to a work deck of a cable laying vessel, i.e. about horizontal. It may have advantages to provide an embodiment wherein the support elements are tiltably connectable to a support, such as the work deck of the vessel. In such embodiment, in particular the first support element may be brought from a substantially horizontal position to a tilted position having a non-zero tilt angle with respect to the plane of the work deck.

A substantially vertical position of the first cable support element may for instance be used to bring the cable overboard. An embodiment of the device thereto further comprises hoisting means for bringing the first cable support element overboard, preferably in a substantially vertical position. This allows bringing a cable length to the seabed in a supported state, i.e. supported by the first cable support element.

Another embodiment of the invention provides a device that further comprises means for translating the overboarding support element in response to changes in the tension of the article between the storage unit and the pulling means.

Preferably, such means for translating the overboarding support element are adapted to keep a constant tension in the article. These embodiments of the device allow compensating any difference in article tension between the storage unit and the pulling means, and in general help reducing the risk for damage to the article. Also, these embodiments may prevent slack appearing in a paid out article to be trenched for instance. Obviously, slack in an article is less desired since it may become entangled in other equipment such as trenching equipment, and/or form loops that may result in damage to the cable.

The buffering support system is instrumental in providing an additional length of article on board of the vessel. If more additional length is needed, an embodiment of the device that comprises a plurality of buffering support systems is advantageous.

The first support element is optionally translatable in the first direction in which the article is brought overboard, whereas the support elements of the buffering support system are translatable in a second direction that differs from the first direction. In another embodiment of the invention, the device further comprises one or more fixed article support elements defining the article path on the vessel.

The device may be used for paying out flexible elongated articles in general, but its use in cable-laying operations is preferred, in particular in off-shore cable laying operations carried out by a cable-laying vessel or other floating device.

In another aspect therefore, the invention relates to a vessel, a cable-laying vessel, comprising the invented device according to any one of the disclosed embodiments, and adapted for paying out a flexible elongated article, preferably a cable, from the article storage unit overboard the vessel.

The device may be installed on the vessel in any conceivable way. A practical embodiment is provided by a vessel wherein the first direction in which the article is bought overboard through the overboarding guide means extends parallel to the longitudinal direction (or amidships axis) of the vessel. The support elements of the buffering support system are then preferably translatable in a direction perpendicular to the longitudinal direction of the vessel, i.e. in an athwartships direction.

Yet another aspect of the invention provides a method for paying out a flexible elongated article from a vessel. The method comprises storing the article on a storage unit, pulling a length of article from the storage unit towards an overboarding guide means, bringing an article end overboard via the overboarding guide means, whereby an article's path is defined between the storage unit and the overboarding guide means by support means for the article, comprising an overboarding support element and a buffering support system, whereby the length of the article path is varied by optionally translating the overboarding support element in a first direction, and by translating a support element of the buffering support system in a second direction different from the first direction.

Yet another aspect of the invention provides a method for connecting a cable to an off-shore wind turbine generator, the method comprising sailing a cable laying vessel according to the invention and provided with the invented device to the wind turbine generator, positioning the cable-laying vessel in close proximity of the wind turbine generator, bringing a cable end overboard via the overboarding guide means, and pulling a length of the cable upwards along the wind turbine generator for connection to a wind turbine generator, the length being provided by an additional cable length provided on the cable laying vessel by a cable path that comprises the second and/or first cable support element. The method in accordance with the invention does not need the step of sailing the cable-laying vessel away from the wind turbine generator to provide the additional length of cable, needed to bridge the distance of the sea bed to a connection point of the wind turbine generator. This additional length of cable is provided by leading the cable over the second cable support element. The invention also prevents the vessel to sail back to the wind turbine generator after having laid the additional length of cable on the seabed.

A method wherein the additional length of the cable is paid out by translating the second cable support element is particularly preferred.

It is explicitly mentioned that the embodiments disclosed in the present application may be combined in any possible combination of these embodiments, and that each separate embodiment may be the subject of a divisional application.

BRIEF DESCRIPTION OF THE DRAWINGS

The invention will now be described in more detail by reference to the attached figures, and a cable laying embodiment. It is however explicitly mentioned that the invention is not limited to laying cables and the invention encompasses laying any other elongated flexible article on or into a seabed.

FIGS. 5A, 5B and 5C schematically show a buffering system according to an embodiment of the invention.

DESCRIPTION OF THE INVENTION

Figure 1:
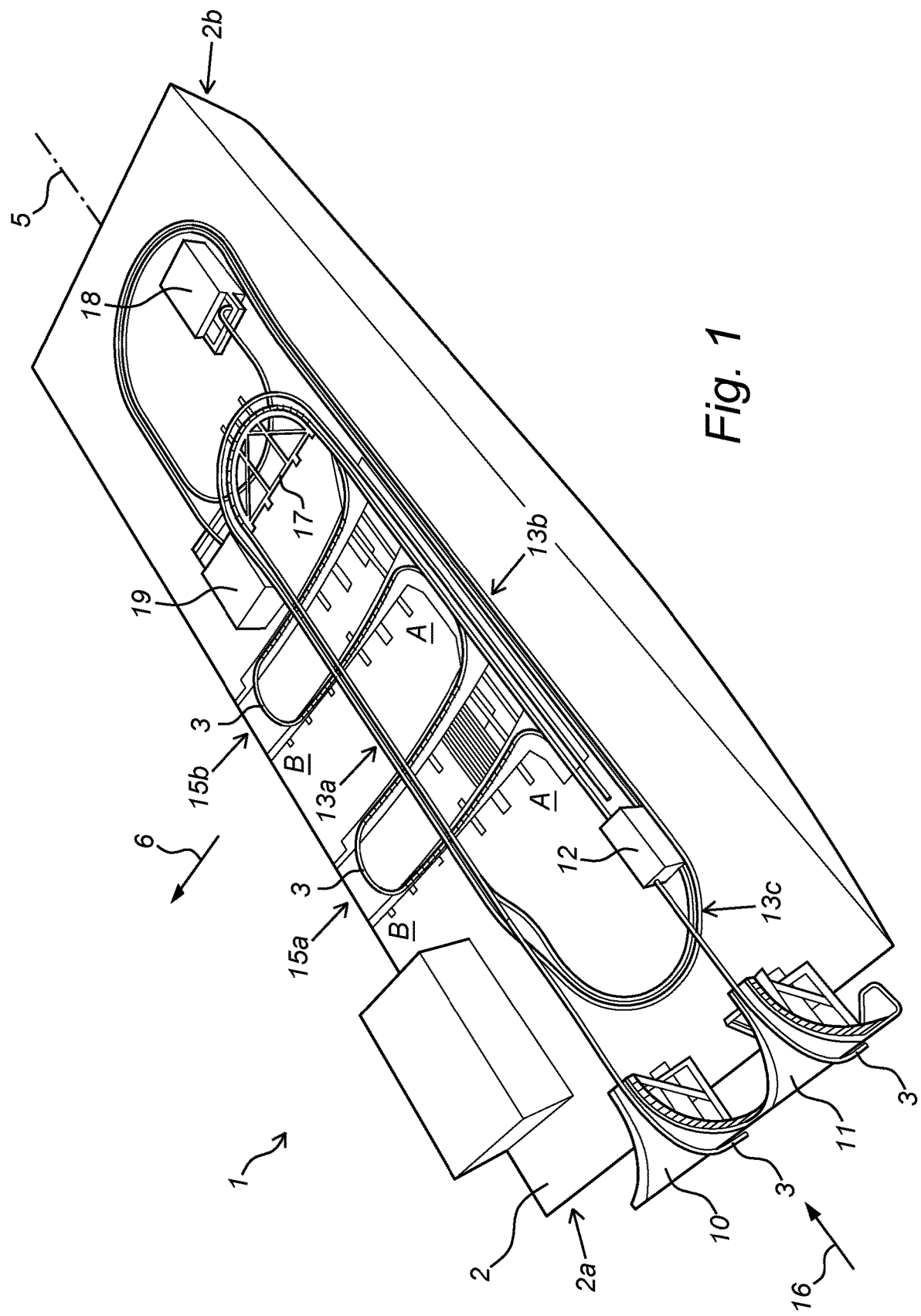
FIG. 1 schematically shows a perspective view of a cable laying vessel provided with a device according to one embodiment of the invention.

Referring to FIG. 1, a part of the deck 2 of a vessel 1 for laying cables 3 on or in a sea bed is shown. The vessel 1 is at the rear side 2a of the deck 2 provided with a portside chute 10 and a starboard chute 11 for guiding a cable, for instance data transmission cable 3. The chutes (10, 11) may be used to reel in a cable 3 from a suitable source, such as an onshore cable rack (not shown), but may also be used to bring out of board cable 3 during a cable laying operation off shore. A cable tensioner 12 may be present to pull the cable 3 along support means in the form of port side and starboard cable trays (13a, 13b). The cable trays (13a, 13b) are supported by the work deck 2 of the cable laying vessel 1 and/or by may be at least partly supported by other structures as well (not shown) for instance to elevate and hold the trays (13a, 13b) above work deck level.

Figure 2:
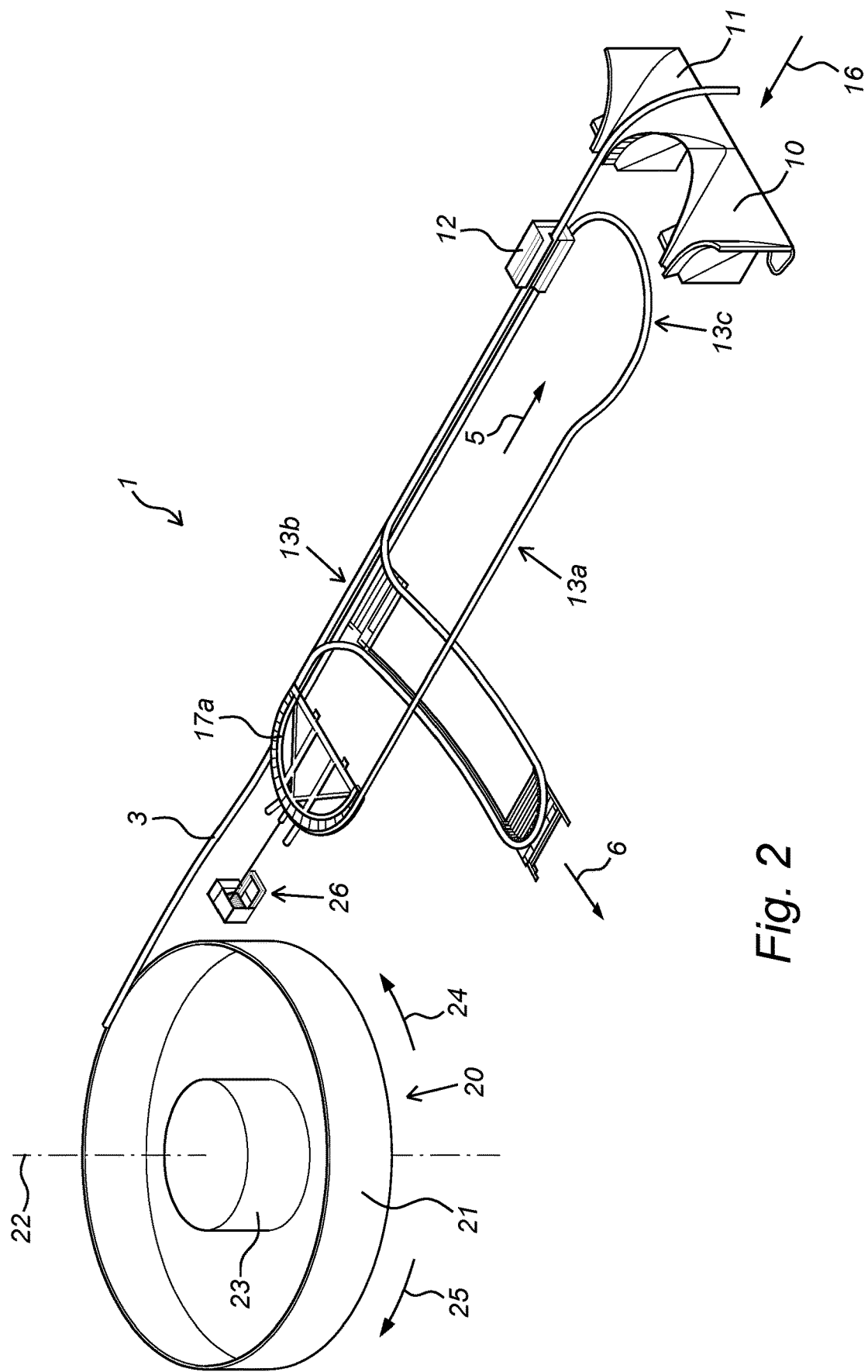
FIG. 2 schematically shows a perspective view of a device according to another embodiment of the invention.
Figure 5B:
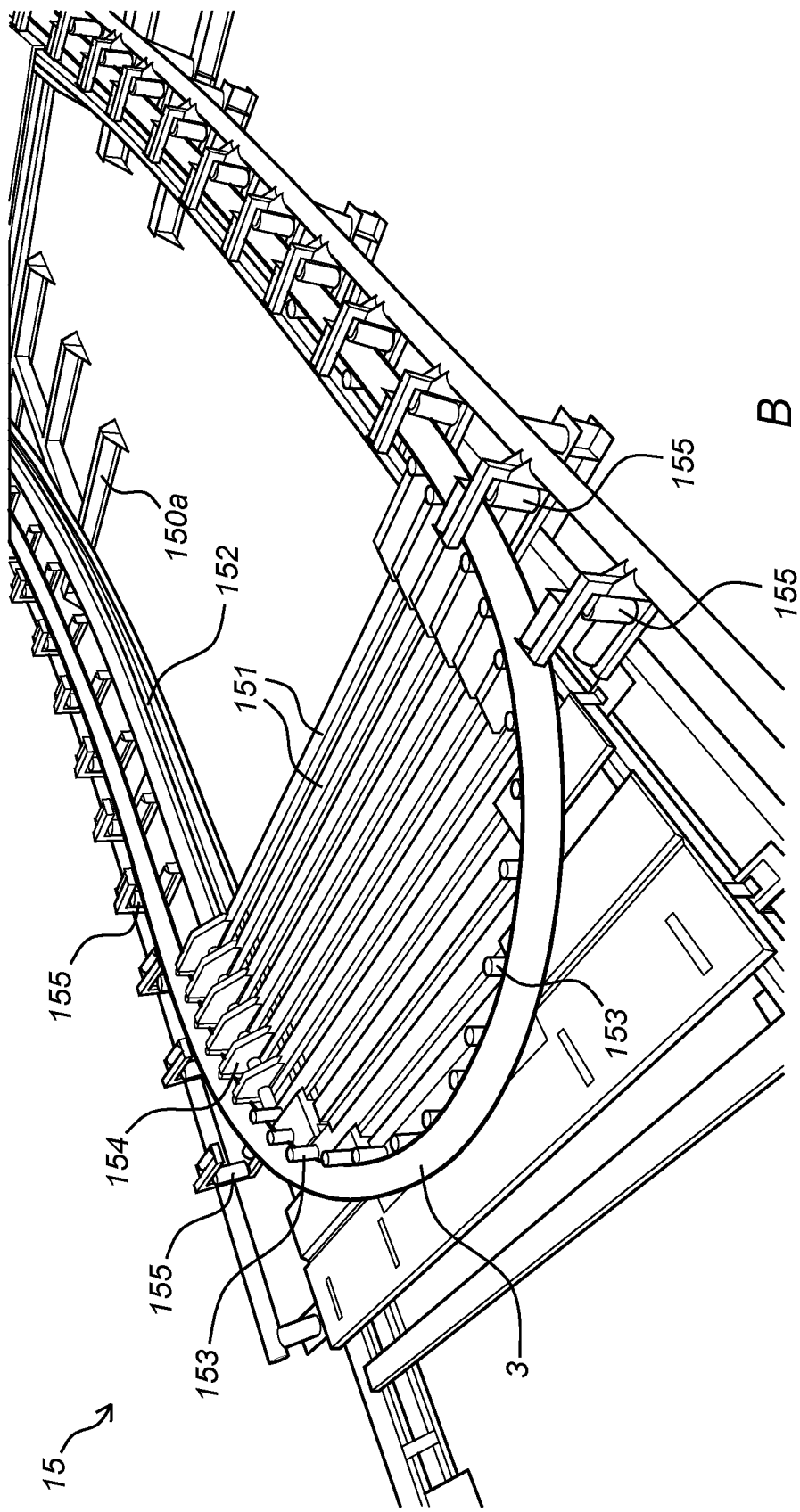
Figure 5C:
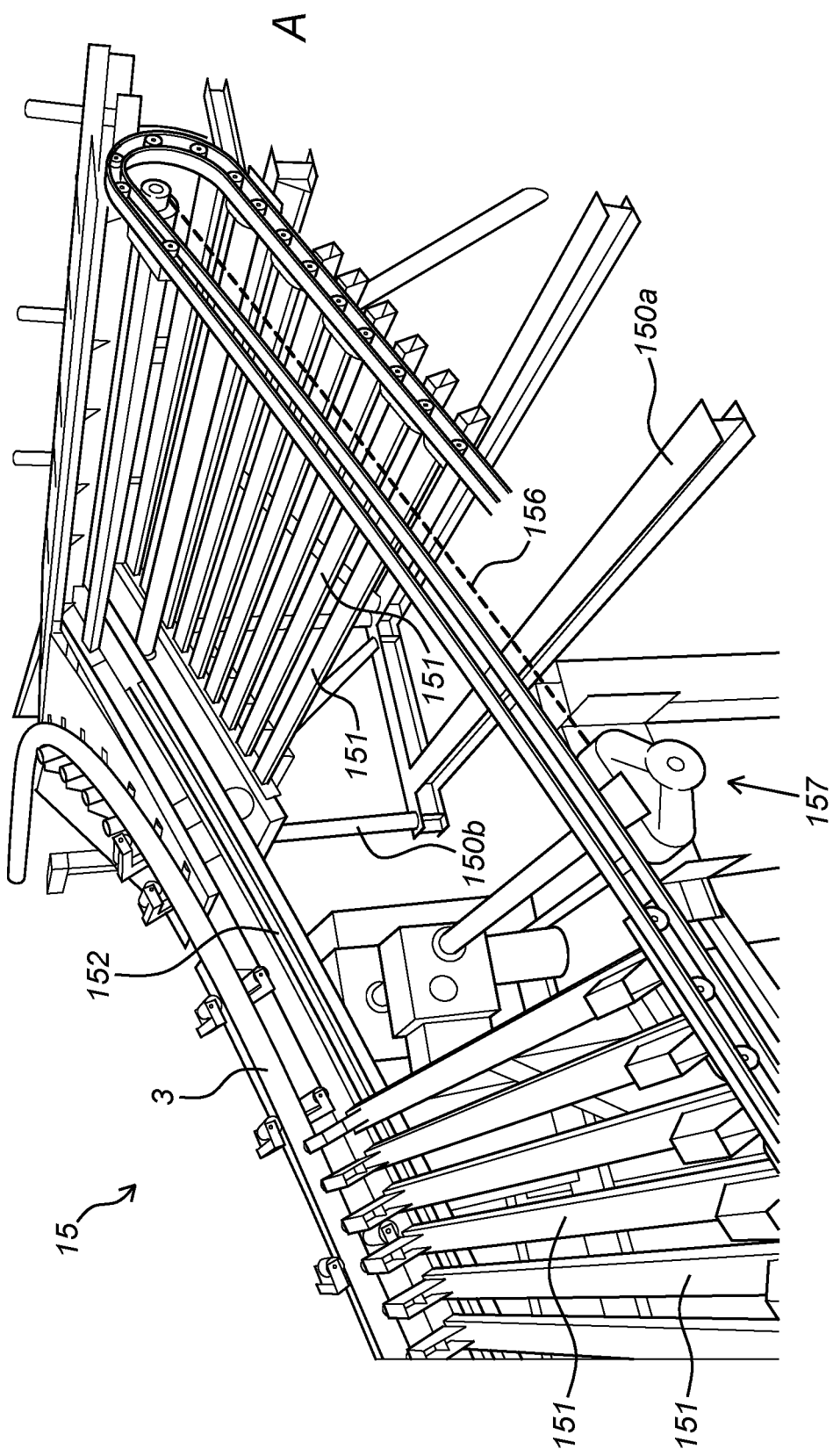

As shown in FIGS. 1 and 2, a cable 3 that is pulled in from shore in the direction 16 is led along a path that may at least comprise an overboarding cable support element in the form of quadrant 17 (as shown in FIG. 1) to a cable storage unit 20 for storing a length of cable 3. When overboarding cable 3, buffering support systems (15a, 15b) become operational. As best shown in FIGS. 5A, 5B and 5C, each buffering support system 15 comprises a plurality of support elements in the form of carriers 151 that are translatable in the second direction 6 on a rail guide 152 provided along the path of the cable 3. The plurality of carriers 151 is provided one against the other. The carriers 151 and guide rails 152 are supported by a frame of members 150a provided on the work deck 2 of the vessel, and upstanding frame members 150b that define an upward slope from a portside of the vessel towards a starboard side thereof. The cable 3 is led between upwardly extending rollers 155 provided on the frame (150a, 150b) and elements 154 provided at the sides of the carriers 151. A semi-circular track is defined by a plurality of upwardly extending pins 153 provided on some carriers 151 at a portside end B of the buffering system 15. The path of the cable 3 on the buffering system (15, 15a, 15b) is thus defined by the position of the rollers (155), the elements 154, the pins 153 and the carriers 151. The carriers 151 may be translated in the second direction 6 by a traction cable 156 (see FIG. 5C) driven by a motor 157. At a starboard end A of the buffering system 15, carriers 151 are guided such that they are brought or folded back underneath their principal plane of movement, much like a flexible garage door would do.

Preferably, according to an embodiment of the device, the overboarding and/or buffering support element(s) are translatable by pulling on a flexible pulling means such as a rope provided along the cable path.

In operation, a flexible article such as cable 3 is typically led along the support means ((13a, 13b) and over the overboarding support element 17 and/or the buffering support elements 151 of each buffering support system 15. The carriers 151 are translatable in an athwartships direction 6 of the vessel between a short position at a starboard end A that corresponds to a short cable path length to a long position at a portside end B that corresponds to a long cable path length. On the cable-laying vessel 1 shown, the short position A of the carriers 151 corresponds to a position that is relatively close to an undeviated path of a cable 3 (not using the buffering system 15). The long position B corresponds to a position in which a maximum length of cable 3 is buffered. Since the carriers 151 of the buffering system 15 are translatable in an athwartships direction 6, this allows varying the length of the cable 3 on the work deck of the vessel 1.

At least one first cable support element (17, 17a) may in an embodiment also be translatable in a longitudinal direction parallel to the amidships axis 5 of the vessel 1. Another curved part of the path of the cable 3 may be static, for instance provided by a curved channel 13c of the work deck 2. The quadrant structures (17, 17a) and channel 13c guide a cable 3 along an arc with a radius that is equal or larger than the minimum bending radius (MBR) of the cable 3, this in order to prevent damaging or even breaking of the cable 3. To facilitate cable handling, the overboarding quadrant structures (17, 17a) may be tilted from a horizontal position parallel to the surface of the deck 2 (as shown) to a substantially vertical position in which their plane is about perpendicular to the plane of the deck 2.

As shown in FIGS. 1 and 2, the cable 3 is guided further from the channel 13c along the starboard cable tray 13b to a deck penetration 18 which offers access to a storage unit 20 (shown in FIG. 2) provided in an area below deck 2. Storage unit 20 may for instance comprise a carousel around which the cable 3 is wound up until a predetermined filling degree of the storage unit 20 is reached. In a practical embodiment, cable 3 surfaces from this deck penetration 18 again and is then led to another deck penetration 19 giving access to another storage unit provided in an area below deck 2. The other storage unit (not visible in FIG. 1) is also filled with cable 3, originating from the onshore source and from the storage unit 20. The invention is not limited to the use of two or more storage units 20 and one storage unit 20 suffices to carry out the invention. The deck 2 of vessel 1 may further be provided with other equipment, such as a rack of cable protection system sleeves 4.

As shown in FIG. 2, the storage unit 20 may be arranged below the deck and comprises a cylindrical body 21 in which the cable 3 can be arranged in a circumferential direction around a centrally disposed core 23. The cylinder longitudinal axis 22 of the storage unit 20 extends in a direction about perpendicular to the plane of the deck 2. This direction is substantially vertical. The storage unit 20 may be rotatable around a rotation axis parallel to the cylinder longitudinal axis 22 in a reeling direction 24, in which the cable 3 is reeled in from a source. When paying out a stored cable 3, the storage unit 20 may be rotatable around a rotation axis parallel to the cylinder longitudinal axis 22 in a paying out direction 25, in which the cable 3 is lead along the overboarding quadrant (17, 17a) and curved channel 13c and finally to the chutes (10, 11) for bringing an end of the cable 3 overboard.

As for instance shown in FIG. 2, the overboaring quadrant (17, 17a) may be translatable by a winch 26 provided on the work deck 2 of the vessel 1. The overboarding quadrant 17a for instance can be translated in a longitudinal direction parallel to the amidships axis 5 in a paying out direction by pulling on a cable 3 provided along the cable path, while the same first quadrant 17a can be translated in a longitudinal direction parallel to the amidships axis 5 in a reeling in direction 16 by pulling on winch 26.

The quadrants (17, 17a), curved channel 13 and the track formed by the pins 153 on the buffering system 15 comprise a semi-circular surface defining a semi-circular cable path. The semi-circular surface prevents damage to the cable 3, for instance by adopting a radius equal to or larger than the minimum radius of curvature of the cable 3. The latter is prescribed by the manufacturer of the cable and defines the minimum bending radius over which the cable may be bent without risking any damage.

For operation and as described above, a cable 3 is lead along the support means (13, 14) and over the overboarding quadrants (17, 17a) and the buffering systems (15a, 15b). The overboarding quadrant (17, 17a) in the embodiments shown are planar structures and arranged such that their plane is about parallel to the work deck 2 of the vessel, i.e. about horizontal, as shown. The carriers 151 of the buffering systems (15a, 15b) however will have an angle with the work deck 2 when brought in the short position at a starboard side A, as shown in FIG. 2. At least the overboarding quadrant 17a is preferably connected to the work deck 2 such that it may be tilted and adopts a position deviating from the horizontal position, preferably a substantially vertical position. Such a position may for instance be used to bring the cable 3 overboard via the chutes (10, 11) in a cable laying operation, as will be elucidated below with reference to FIG. 3.

Figure 3:
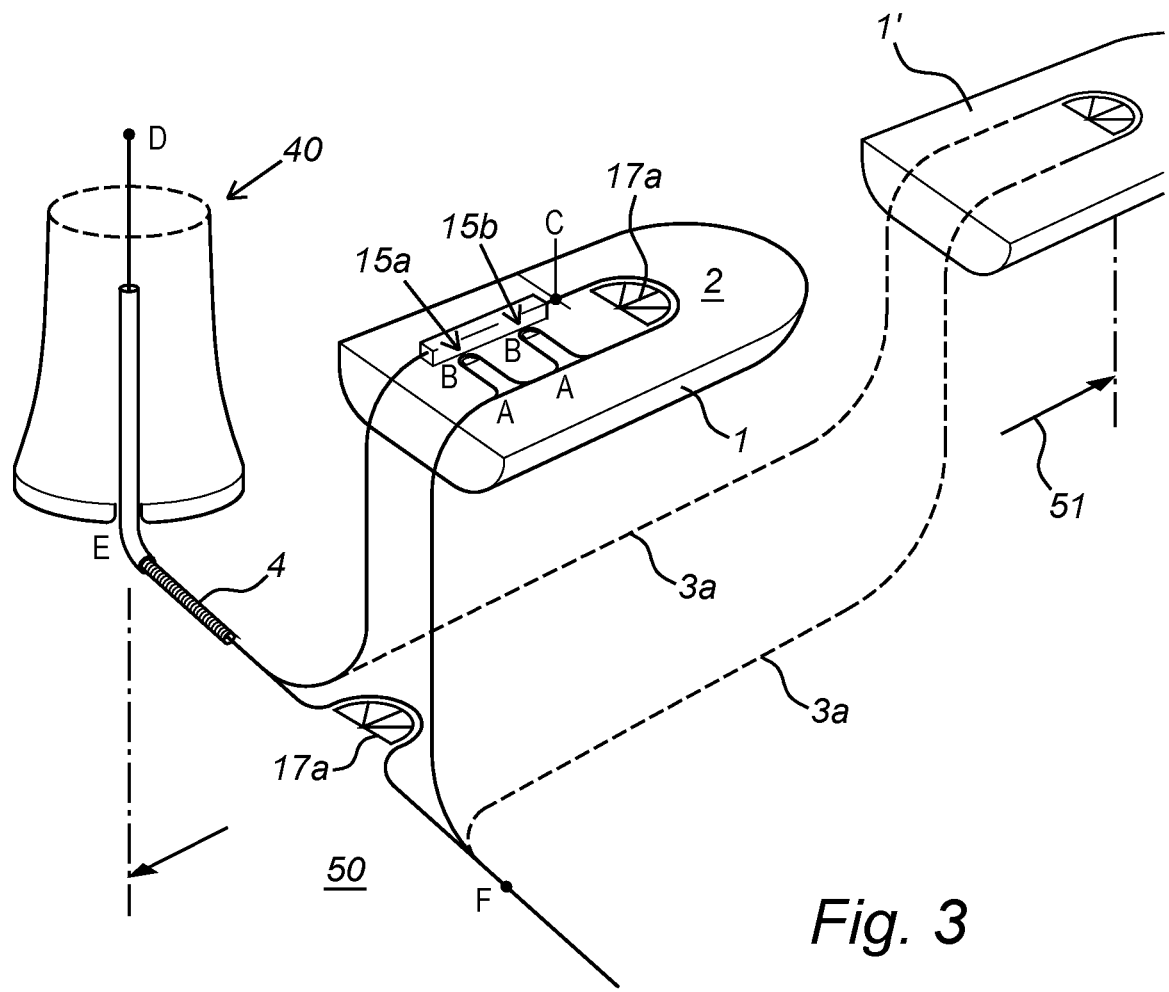
FIG. 3 schematically shows a perspective view of a method for connecting a cable to an off-shore wind turbine generator according to an embodiment of the invention.

The device may be used for paying out cables in general, but its use in cable-laying operations is preferred, in particular in off-shore cable laying operations carried out by a cable-laying vessel 1. The device is also advantageously used in a method for connecting a cable to an off-shore wind turbine generator, or any other offshore structure. An embodiment of such a method is illustrated in FIG. 3. The method comprises sailing a cable laying vessel 1 provided with the invented device to an offshore wind turbine generator 40. The wind turbine generator 40 typically comprises an upright substructure to support the actual turbine components, such as a turbine tower, nacelle with drive train, hub and blades (components not shown). A cable connection point (junction box) is typically located nearby the interface between the substructure and the wind turbine generator at position D. Connecting the wind turbine generator 40 to a cable 3 requires bringing the cable 3 up to the elevated position D for connection to the junction box. With modern wind turbine generators, the height of position D may be up to an beyond 15-25 m above the sea level. The cable-laying vessel 1 is moored in close proximity of the wind turbine generator 40 and a length of cable 3 is reeled off the storage unit 20 (or units) and brought overboard via the overboarding guide means in the form of the chutes (10, 11). To bring a length of cable 3 overboard usually requires providing an outer free end of the cable 3 with a protective sleeve 4. The cable 3 is then pulled along the cable path by pulling trough the protective sleeve 4. Bringing a length of cable 3 overboard can be done in a number of ways. One of the safest ways involves bringing the first quadrant 17a to a position close to the rear stern 2a of the vessel 1, then bringing the first quadrant 17a with a supported cable 3 length overboard, preferably in a substantially vertical position, and positioning the first quadrant 17a in a substantially flat position on the sea bed 50. This allows bringing a length of cable 3 to the seabed 50 in a supported state, such that the risk for damage is minimized. Positioning the first quadrant 17a on the sea bed may be carried out by any suitable means, for instance by hoisting means (not shown) provided for this purpose on the vessel 1. Suitable hoisting means comprise a crane boom for instance.

As shown in FIG. 3, a length ED of cable 3 needs to be pulled upwards along the wind turbine generator 40 from a position E close to its bottom to the position D close to the interface between the substructure and the wind turbine generator tower for connection to the junction box. To be able to do this requires a total length of cable 3 of about DECF, as show in FIG. 3. The required cable length DECF is usually larger than the available length CF, prior to pull in. In a known method, the available length CF is increased by sailing the vessel 1 away from the wind turbine generator 40 along a distance 51. The additional length 3a of cable 3 is provided on the sea bed 50. In the known method the cable 3 has then to be pulled into the wind turbine generator 40 while simultaneously sailing the known vessel 1' towards the wind turbine generator 40.

This is a cumbersome procedure. The present invention increases the available length CF by adding cable loops in the cable length between C and F.

The device of the invention provides the length needed for connection by an additional cable length provided on the cable laying vessel 1 itself by a cable path that comprises one or more of the second quadrants 15. The invention also prevents the vessel 1 to sail back to the wind turbine generator 40 after having laid the additional length of cable on the seabed 50, and in fact allows to moor the vessel 1 close to the wind turbine generator 40 during the connection operations. The second quadrants 15 provide sufficient length for accommodating the additional cable length needed. During pulling up of the cable 3 along the wind turbine generator 40, cable 3 is paid out overboard the vessel 1 and the second quadrants 15 are simultaneously moving form their long position B to their short position A to 'release' the additional cable length.

Figure 4:
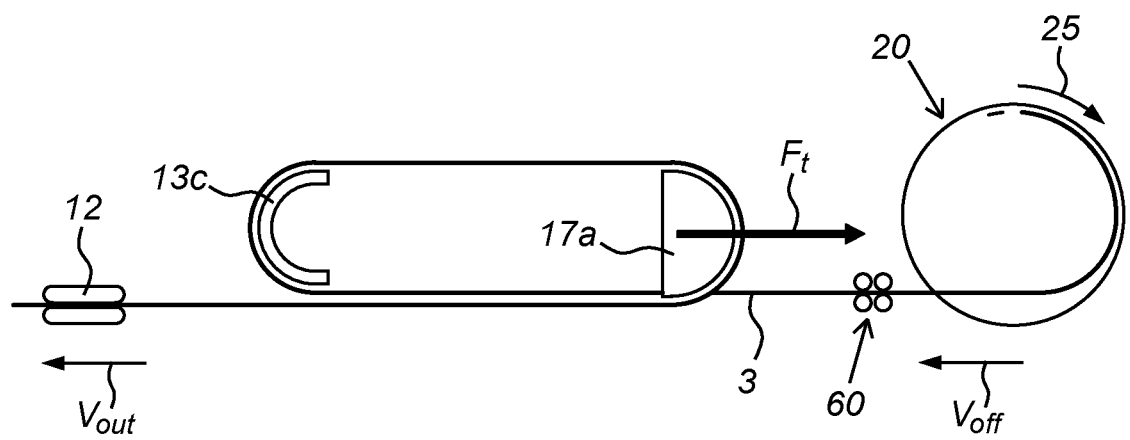
FIG. 4 schematically shows a device comprising means for translating a cable support element in response to changes in the tension of the cable between a storage unit and pulling means in accordance with an embodiment of the invention.

During paying out of the cable 3, the tensioner(s) 12 holds the cable 3 to prevent uncontrolled reeling off of the cable 3 from the storage unit 20. The reeling off speed $v_{off}$ of the cable 3 from the storage unit 20 may be regulated by a control device 60, for instance a pair of rollers that controls the speed of rotation of the storage unit 20 in the reeling off direction 25. The tensioner 12 is adapted to control the paying out speed $v_{out}$ of the cable 3 during paying out. In order to avoid differences in the paying out speed $v_{out}$ of the tensioner 12 and the reeling off speed $v_{off}$ of the storage unit, an embodiment of the invention further comprises means for translating the overboarding support element or quadrant (17, 17a) in response to changes in the tension $F_t$ of the cable 3 between the storage unit 20 and the tensioner 12. Such an embodiment is schematically shown in FIG. 4 and comprises means for translating the overboarding support element 17a adapted to keep a constant tension $F_t$ in the cable 3. Such means may be embodied by constant tension winches 26. A constant tension winch will pull on the respective quadrant (17, 17a) when the tension in the cable 3 drops, and will relax when the tension in the cable 3 increases. This results in a movement of one or more of the quadrants (17, 17a) during sailing and/or during paying out the cable 3, thereby lengthening or shortening the cable path between said quadrants (17, 17a) to keep the cable tension $F_t$ about constant.

The invention claimed is:

1. A device for paying out an elongated flexible article from a vessel, the device comprising a storage unit for the article, overboarding guide means for the article, article support means defining a path for the article between the storage unit and the overboarding guide means, and pulling means for advancing the elongated article along the path, wherein the article support means comprise an overboarding support element adapted to be translated in a first direction and bring a length of cable overboard, and a buffering support system comprising a buffering support element, adapted to be translatable in a second direction, that is different from the first direction, whereby a translation of the buffering support element has the effect of varying the length of the article path, wherein the buffering support element is translatable between a short position that corresponds to a short path length of the article to a long position that corresponds to a long path length of the article.

2. The device according to claim 1, wherein the second direction is perpendicular to the first direction.

3. The device according to claim 1, wherein the buffering support system comprises a plurality of support elements that are translatable in the second direction on a rail guide provided along the path of the article.

4. The device according to claim 1, wherein the overboarding support element and/or the buffering support system comprise a curved surface and/or curved track defining the article's path.

5. The device according to claim 4, wherein the curved surface and/or curved track is semi-circular.

6. The device according to claim 4, wherein the curved track comprises a plurality of rollers and/or fingers between which the article is guided.

7. The device according to claim 1, further comprising hoisting means for bringing a first cable support element overboard.

8. The device according to claim 1, further comprising means for translating the overboarding support element in response to changes in the tension of the article between the storage unit and the pulling means.

9. The device according to claim 8, wherein the means for translating the overboarding support element are adapted to keep a constant tension in the article.

10. The device according to claim 1, comprising at least two buffering support systems.

11. The device according to claim 1, further comprising a fixed support element for the article defining the article's path.

12. A vessel comprising a device according to claim 1 for paying out a flexible elongated article from the storage unit overboard.

13. The vessel according to claim 12, wherein the first direction is parallel to the longitudinal direction of the vessel.

14. A method for paying out a flexible elongated article from a vessel, the method comprising storing the article on a storage unit, pulling a length of the article from the storage unit towards an overboarding guide means, bringing an article end overboard via the overboarding guide means, whereby an article's path is defined between the storage unit and the overboarding guide means by support means for the article, comprising an overboarding support element and a buffering support system, whereby the length of the article path is varied by translating the overboarding support element in a first direction, and by translating a support element of the buffering support system in a second direction different from the first direction.

15. A method for connecting a cable to an off-shore wind turbine generator or any other offshore structure, the method comprising sailing a vessel to the wind turbine generator or other offshore structure, the vessel comprising a device for paying out an elongated flexible article from the vessel, the device comprising a storage unit for the article, overboarding guide means for the article, article support means defining a path for the article between the storage unit and the overboarding guide means, and pulling means for advancing the elongated article along the path, wherein the article support means comprise an overboarding support element adapted to be translated in a first direction and bring a length of cable overboard, and a buffering support system comprising a buffering support element, adapted to be translatable in a second direction that is different from the first direction, mooring the vessel in close proximity of the structure, bringing a cable end overboard via an overboarding guide means, and pulling a length of the cable upwards along the structure for connection to a connection point of the structure, varying the length of cable being provided by an additional cable length provided on the vessel by translating the buffering support system in the second direction.

16. The method according to claim 15, whereby the additional length of the cable is paid out by translating a support element of the buffering support system.

* * * * *